(12) United States Patent
Johnson (10) Patent No.: US 6,215,940 B1
(45) Date of Patent: Apr. 10, 2001

(54) HIGH VOLTAGE INSULATOR FOR OPTICAL FIBERS

(75) Inventor: Leonard A. Johnson, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/088,539

(22) Filed: Jun. 1, 1998

(51) Int. Cl.[7] ........................................ G02B 6/44
(52) U.S. Cl. ................... 385/136; 385/101; 385/134; 174/139; 174/179
(58) Field of Search ................................. 385/100, 101, 385/136, 134; 174/80, 139, 167, 179; 324/96

(56) References Cited

U.S. PATENT DOCUMENTS

| | | | |
|---|---|---|---|
| 4,610,033 | * 9/1986 | Fox, Jr. ............................... | 174/139 |
| 4,613,727 | * 9/1986 | Salanki et al. ...................... | 174/139 |
| 4,717,237 | 1/1988 | Austin ................................. | 350/96.23 |
| 4,772,090 | 9/1988 | Atkins et al. ....................... | 350/96.23 |
| 4,802,731 | 2/1989 | Maschek et al. ................... | 350/96.23 |
| 5,069,525 | * 12/1991 | Seike et al. ......................... | 385/100 |
| 5,124,634 | 6/1992 | Ulmer, Jr. et al. ................. | 324/96 |
| 5,268,983 | * 12/1993 | Tatarka et al. ..................... | 385/106 |
| 5,594,827 | * 1/1997 | Joulie et al. ........................ | 385/101 |
| 6,051,796 | * 4/2000 | Kuhl et al. .......................... | 174/179 |

FOREIGN PATENT DOCUMENTS

| | | |
|---|---|---|
| 42 27 410 C1 | 11/1993 | (DE) . |
| 0 146 845 | * 7/1985 | (EP) . |
| 0 182 575 A2 | 5/1986 | (EP) . |
| 0 704 735 A1 | 4/1996 | (EP) . |
| 2 363 170 | 4/1976 | (FR) . |

* cited by examiner

Primary Examiner—Hemang Sanghavi
(74) Attorney, Agent, or Firm—Matthew B. McNutt (57) ABSTRACT

A high voltage insulator for use with optical fibers includes an insulative support rod with at least one optical fiber wrapped about the support rod. The optical fiber and support rod are covered by an outer elastomeric skirted insulative sleeve which squeezes the optical fibers against the support rod. A dielectric sealant, such as a silicone gel, is dispersed along the optical fiber to fill any voids which occur adjacent the optical fiber, thereby providing a void-free bond between the interior surfaces of the insulator. The elastomeric outer sleeve provides a resilient barrier against the ingress of moisture. In a preferred embodiment, an inner layer of elastomeric material is provided between the support rod and the optical fiber to provide additional cushioning of the fiber and to reduce the size of voids which may occur adjacent the fiber.

16 Claims, 6 Drawing Sheets

HIGH VOLTAGE INSULATOR FOR OPTICAL FIBERS

BACKGROUND OF THE INVENTION

The present invention relates to optical fibers, and in particular to optical fibers which are installed in contact with or closely adjacent to high voltage electrical equipment, such as high voltage power conductors.

The number of applications of optical fibers on overhead high voltage conductors is growing at an increasing rate as the general use of fiber optic systems continues to increase at a rapid rate. High voltage applications are generally associated with fiber optic devices such as current, voltage and temperature sensors installed on an electrical network to monitor the network operating conditions. In addition, fiber optic cables are often attached to high voltage conductors and used for long distance voice, video and data communications.

Although optical fibers are inherently good dielectric materials, they still constitute a threat to the integrity of the high voltage power system on which they are installed if proper precautions are not taken at all transition points where the fiber optic system is connected to electrically grounded opto-electronic signal processing equipment. A particular problem encountered when taking a fiber optic system from a high voltage potential to a ground potential is dielectric tracking. Dielectric tracking occurs when electric leakage currents flowing on the surface of an insulating material cause surface temperatures to rise to a level at which degradation of the material occurs. Dielectric tracking problems are increased by environmental conditions such as rain, fog, salt spray, dust and numerous industrial pollutants. Once dielectric tracking has been initiated, it tends to perpetuate until the dielectric strength of the insulating system is sufficiently reduced to cause dielectric failure of the system, usually by line to ground flashover.

The coatings, buffers and jackets used on optical fibers are primarily formulated and designed to enhance the handling and physical performance characteristics of the optical fibers with little or no consideration given to the dielectric tracking resistance for high voltage applications. It is therefore necessary that insulators specifically designed to support and protect the optical fibers must be used for high voltage applications.

Although the primary function of an insulator for high voltage applications is to provide a surface resistant to dielectric tracking with sufficient extended creepage length to prevent line to ground flashovers under inclement and contaminated conditions, there are other important performance criteria which must be met. In particular, in high voltage transmission line applications, distances of 10 to 25 feet between the ground and the high voltage line are common. It is thus important that the optical fibers are properly supported and contained to prevent excessive motion due to environmentally induced vibrations of the high voltage conductors and of the optical fibers.

The use of optical fibers in association with high voltage power conductors is known in the prior art. For example, U.S. Pat. No. 4,772,090 discloses an arrangement whereby a fiber optic cable may be routed through or around equipment at different electrical potentials, including ground potential. U.S. Pat. No. 4,717,237 discloses an overhead electric and optical transmission system in which the overhead electric conductor is mechanically secured to a support structure by a tension insulator having a through-bore for an optical fiber. U.S. Pat. No. 5,124,634 discloses an optical current transducer which uses an insulator pedestal as an optical fiber raceway.

The insulator systems of the prior art have disadvantages which would be desirable to overcome. In particular, ingress of moisture is a severe problem which will ultimately cause failure of an insulating system. Existing systems that have been modified for use with optical fibers rely on mechanical sealing mechanisms at each end of the insulator to prevent the ingress of moisture. Such mechanical seals are susceptible to failure after repeated thermal cycling. It would therefore be desirable to devise an insulation system which does not rely on mechanical seals. Also, the prior art insulators are typically made of ceramic or other heavy materials, making such insulators difficult to use in some situations. Further, prior art insulators are not easily adapted to different application configurations, such as varying line to ground distances. It would therefore be desirable to provide an insulation system which is easily adapted for differing applications, and which is lightweight as well.

SUMMARY OF THE INVENTION

The present invention provides a high voltage insulator for use with optical fibers which is light weight, easily adapted to different applications, and resistant to the ingress of moisture over repeated thermal cycles and long periods of time. The insulator includes an insulative support rod about which is wrapped at least one optical fiber. The optical fiber and support rod are covered by an elastomeric skirted insulative sleeve which squeezes the optical fibers against the support rod. A dielectric sealant, such as a silicone gel, is dispersed along the optical fiber to fill any voids which occur adjacent the optical fiber, thereby providing a void-free bond between the interior surfaces of the insulator. The elastomeric insulative sleeve covering the optical fibers provides a resilient barrier against the ingress of moisture. In a preferred embodiment, a resilient elastomeric layer of material is provided between the support rod and the optical fiber to provide additional cushioning of the fiber and to reduce the size of any voids which may occur adjacent the fiber. The elastomeric insulating materials are preferably silicone. The insulator is easily adapted to different voltage requirements by simply changing the length of the insulator.

The insulator may incorporate additional sensing elements to create a "smart" insulator for monitoring line conditions such as icing, wind loading, etc.

BRIEF DESCRIPTION OF THE DRAWINGS

FIG. 2b is a greatly enlarged view of the circled portion, of FIG. 2a.

FIG. 4b is a greatly enlarged view of the circled portion of FIG. 4a.

DETAILED DESCRIPTION OF THE INVENTION

The insulator system of the present invention is designed to protect and support optical fibers between a high voltage conductor and electrical ground. The insulator is designed to be anchored at both extremities, the high voltage end to a structurally sound high voltage conductor or conductor assembly and the other end to a structurally secure ground attachment. The inventive insulators are configured to support only a limited amount of load when applied in a free standing configuration. The insulator system construction is based around a solid rod of a high grade dielectric material. The external diameter of the rod can vary to meet specific application criteria, such as the length and number of optical fibers to be incorporated. The length of the rod depends primarily upon the voltage level of the system on which it used. The preferred embodiments of the insulator system construction are described below.

Figure 1:
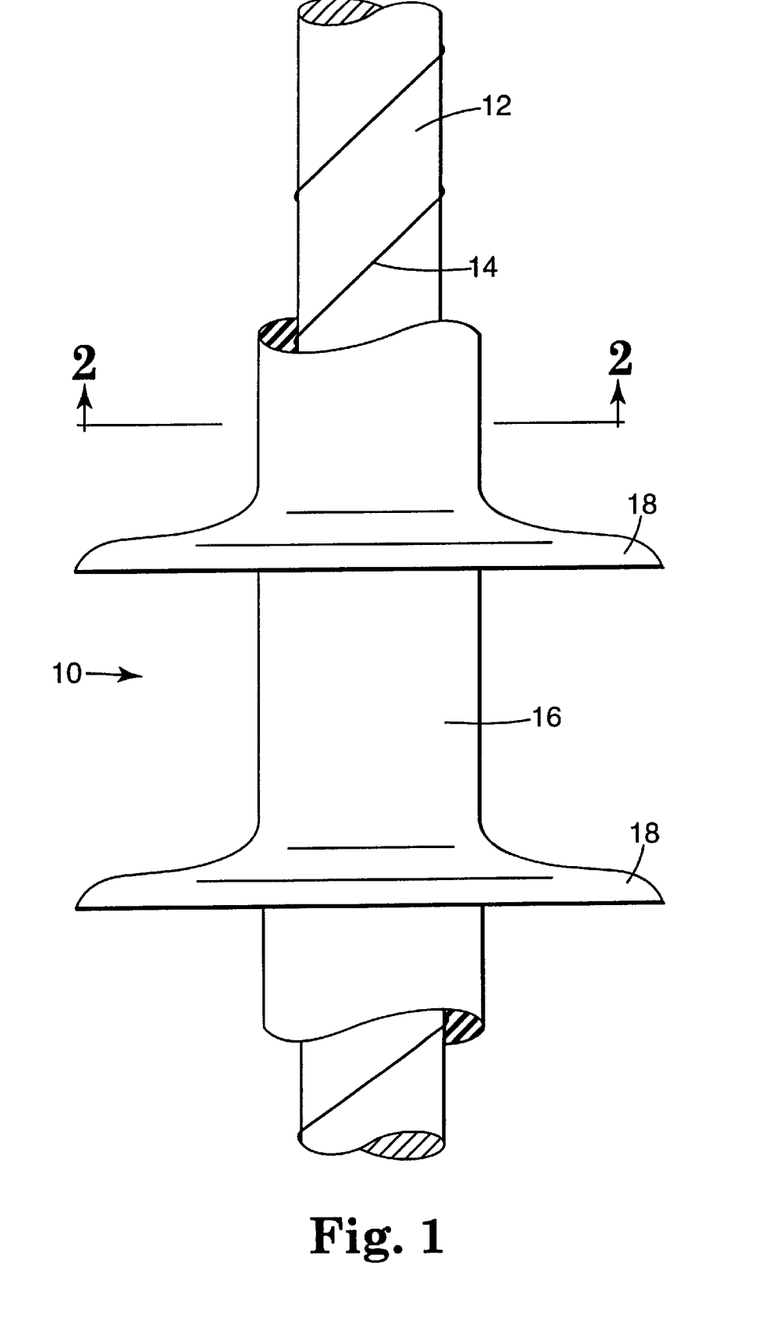
FIG. 1 is an elevational view of a section of the novel insulator, with a portion of the insulative cover removed.

A first preferred construction of the inventive insulator system 10 is shown in FIG. 1. Insulator system 10 includes a support rod 12 formed from a suitable material, such as fiberglass or PVC. Optical fibers 14, which may be coated and unjacketed, are wrapped around the surface of support rod 12 in a helical fashion consisting of approximately one or more turns over the length of support rod 12. The number of turns of optical fibers 14 about support rod 12 may be altered to suit the particular application of the user, and are in particular dependent on the overall length of the support rod 12, which will vary according to the voltage requirements of the finished insulator system 10. The purpose of the helical application of optical fibers 14 about support rod 12 is to minimize the physical forces exerted on optical fibers 14 during large temperature changes which cause differential rates of expansion or contraction between support rod 12 and optical fibers 14.

An insulator sleeve 16 is applied over support rod 12 and optical fibers 14. Insulator sleeve 16 preferably is formed from silicone material, such as dimethylpolysiloxane, although other insulative materials, such as ethylene-propylene rubber, could also be used. Additionally, it is preferred that insulator sleeve 16 have skirts 18 for increasing the dielectric tracking length of insulator system 10. Insulator sleeve 16 is preferably applied to support rod 12 and optical fibers 14 by removing a support core 20 (shown in FIG. 3) which holds insulator sleeve 16 in an expanded state. As support core 20 is removed, insulator sleeve 16 shrinks onto support rod 12 and optical fibers 14 to secure fibers 14 between support rod 12 and insulator sleeve 16. Such insulating sleeves and support cores are known in the art, and are described, for example, in U.S. Pat. No. 3,515,798 to Sievert, assigned to the assignee of the present invention, and which is incorporated herein by reference. A preferred skirted silicone insulator sleeve is the QTM Cold-Shrink™ skirted silicone insulator available from Minnesota Mining and Manufacturing Company of St. Paul, Minn.

It is important that the integrity of the internal interfaces of insulator system 10 be maintained through repeated temperature cycling and over periods up to 30 years, which is the generally expected field service life of products in the high voltage electric industry. Even minute air voids, when subjected to high voltage electric fields such as those found in the vicinity of high voltage transmission lines, will ionize and break into corona discharges that will ultimately result in failure of the optical fibers 14 and the dielectric insulation system itself. It is therefor necessary to achieve a completely void free insulator system.

Figure 2A:
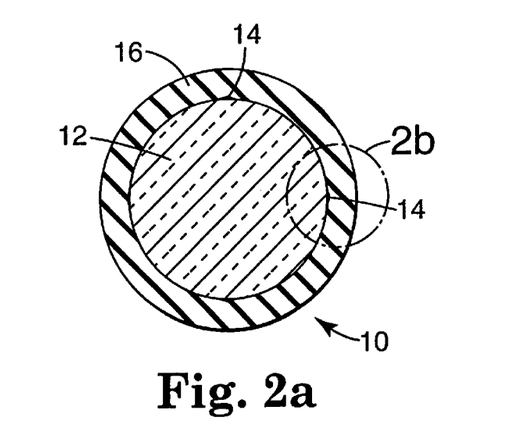
FIG. 2a is a cross-sectional view of the novel insulator, taken along line 2—2 of FIG. 1.
Figure 2B:
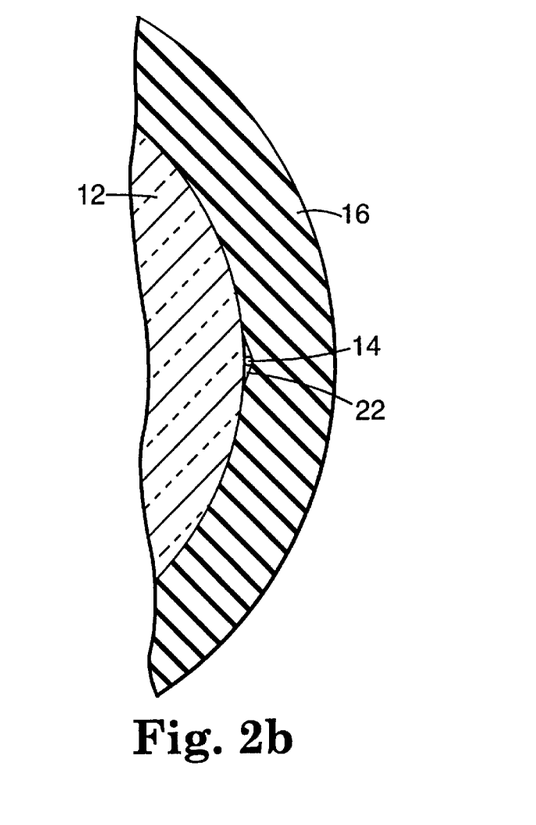
Figure 3:
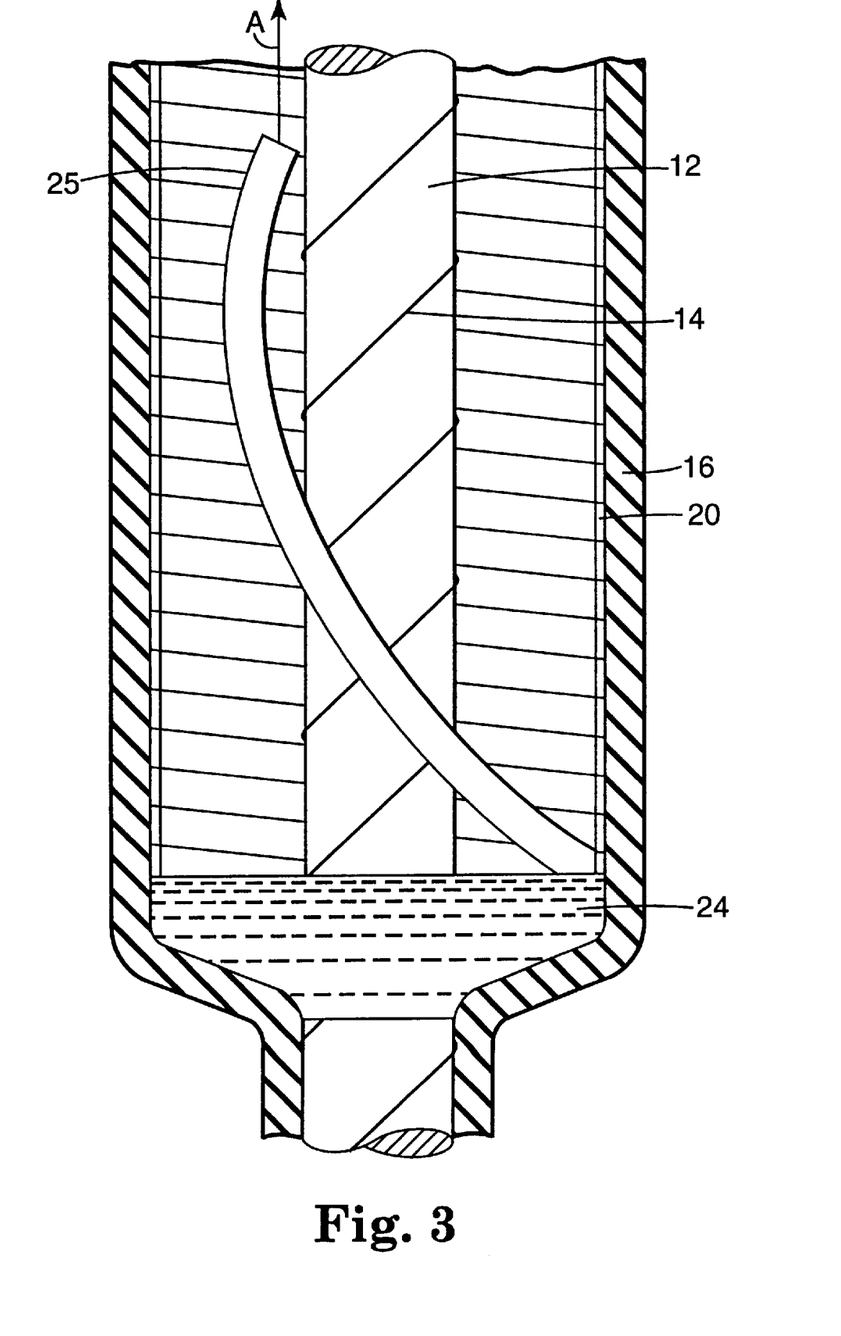
FIG. 3 is an elevational view, partially in cross-section, illustrating the application of the sealant and insulating sleeve over the optical fibers.

As can be seen from FIGS. 2a and 2b, when insulator sleeve 16 is applied over support rod 12 and optical fibers 14, wedge-shaped voids 22 are formed immediately adjacent optical fibers 14. The method used to achieve a complete void-free fill of voids 22 is illustrated in FIG. 3. Voids 22 are filled by pouring a low viscosity sealant 24, such as Dow Corning Sylgard #527 Silicone Dielectric Gel, into the core of insulator sleeve 16 as soon as enough of support core has been removed to form a seal between support rod 12 and insulating sleeve 16. A small reservoir of sealant 24 is maintained in the transition area between the end of support core 20 and insulator sleeve 16 as the core 20 is removed to allow insulator sleeve 16 to shrink down onto support rod 12. Sealant 24 is dispersed into the interstitial voids 22 along optical fibers 14 by the "squeegee" action of insulator sleeve 16 as support core 20 is removed by pulling free end 25 of support core 20 in the direction of arrow A in FIG. 3. This action also continually advances the reservoir of sealant 24 as support core 20 is removed and provides a very efficient application of sealant 24. To achieve satisfactory filling of voids 22, it is preferred that sealant 24 have a viscosity of 750 poise or less, and most preferably has a viscosity of approximately 300–350 centipoise. If the viscosity of sealant 24 is too high, it does not uniformly fill voids 22, which ultimately leads to premature failure of the insulator. After support core 20 has been completely removed, the result is a completely sealed, void-free insulator assembly cable of meeting the most demanding high voltage application requirements.

Figure 4A:
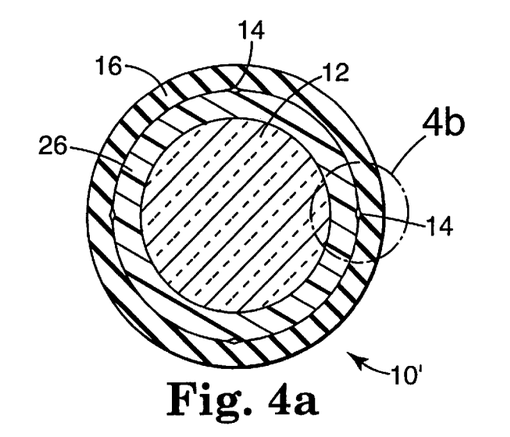
FIG. 4a is a cross-sectional view of an alternate embodiment of the novel insulator.
Figure 4B:
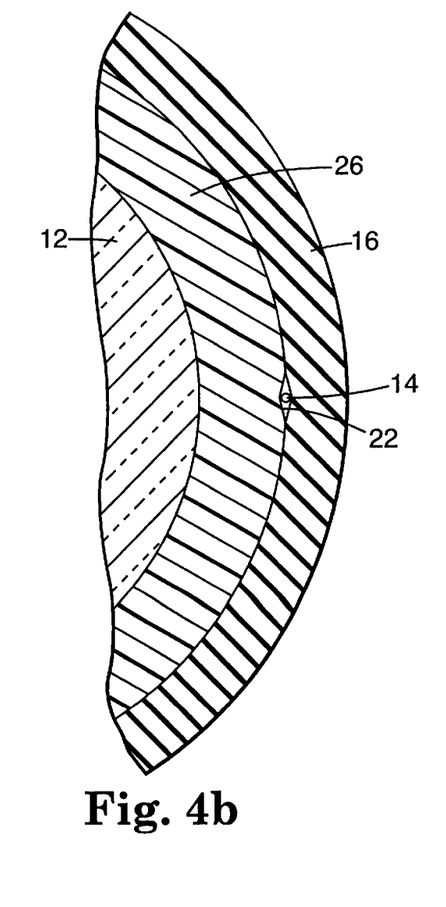
Figure 5:
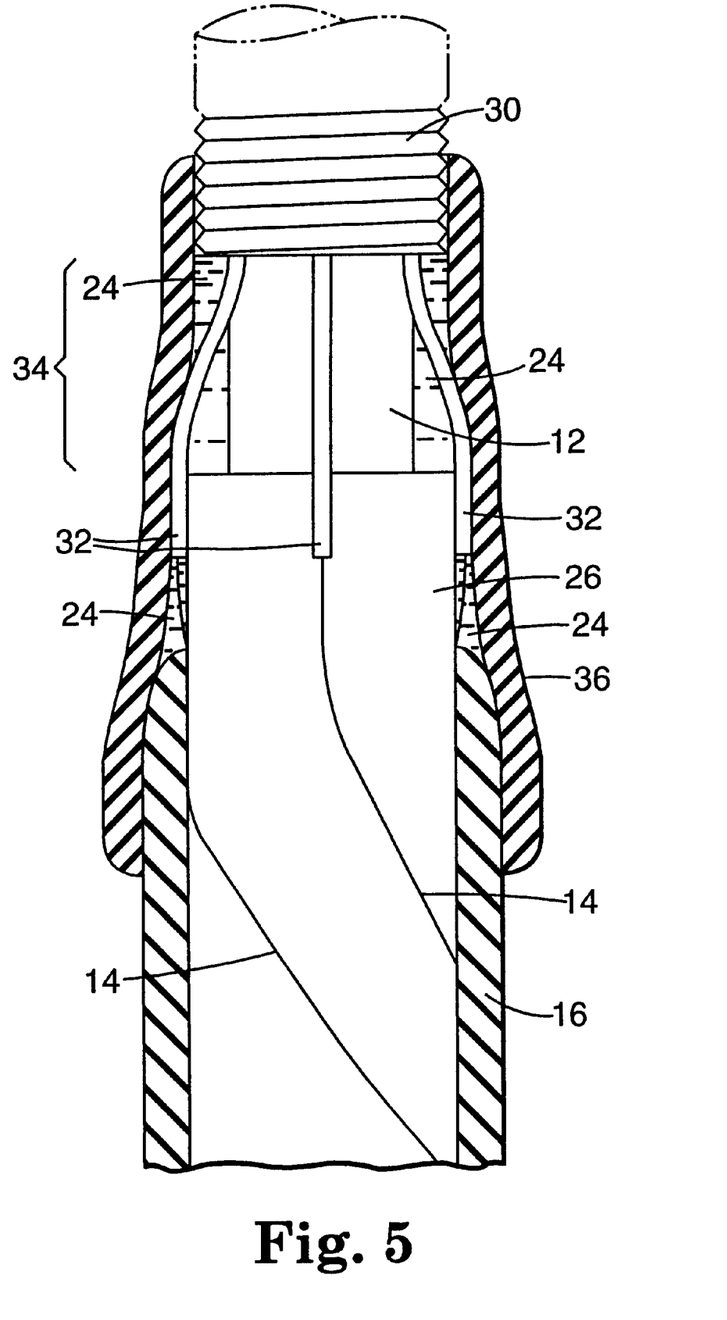
FIG. 5 is an elevational view, partially in cross-section, illustrating the termination of the insulator of FIG. 4a and 4b.

A second preferred embodiment of a fiber optic insulator system 10' is shown in FIGS. 4a–4b and 5.

Insulator system 10' is similar to that described above, except that support rod 12 is first covered with a continuous length of elastomeric tube 26 to provide a resilient base for optical fibers 14. Optical fibers 14 are applied over tube 26 and sealed between tube 26 and insulator sleeve 16 using the same techniques as described above and shown in FIGS. 1–3. Elastomeric tube 26 is preferably formed of silicone, but could alternatively be formed from other insulating materials such as ethylene-propylene rubber. In the configuration shown in FIGS. 4a and 4b, optical fibers 14 are sealed void-free and cushioned between two elastomeric tubes 26, 16. The construction of insulator system 10' provides the required void-free seal with less compressive force applied to optical fibers 14. This is especially important if fibers 14 are of a type that is sensitive to external forces, such as polarizing or polarization maintaining fibers.

The construction of insulating system 10' has the further advantage of creating smaller voids 22' adjacent optical fibers 14.

FIG. 5 shows a longitudinal view, partially in cross-section, of an end of insulator system 10', illustrating the manner in which insulator system 10' may be terminated and anchored. (Insulator system 10 could be terminated in a similar manner). As can be seen in FIG. 5, support rod 12 extends into a threaded terminal 30, which is in turn anchored to either a portion of the high voltage network or to the grounded opto-electrical system. Protective buffer tubes 32 guide optical fibers 14 from inside terminal 30 through transition region 34 onto elastomeric tube 26. Optical fibers 14 are covered with insulator sleeve 16 in the manner described above, and transition region 34 is covered with yet another insulating tube 36. As insulating tube 36 is applied to cover transition region 34, any voids adjacent buffer tubes 32 in transition area 34 are filled, void-free, with sealant 24. The method used to fill voids in transition area 34 is the same as that described above with reference to FIG. 3.

The insulator systems 10, 10' described herein are much lighter and have lower installed costs than existing insulator systems and provide the design flexibility necessary to facilitate the installation of optical fiber devices on high voltage power lines. A particular application in which the inventive insulator systems are useful is with optical sensing and monitoring devices which are used to monitor the performance of high voltage networks. New compact and lightweight optical sensors permit the installation of sensing devices on existing power lines, rather than rerouting the power lines to the location of the sensor. However, installing a sensing device on an existing power line makes necessary an effective insulating and supporting device like that disclosed herein.

Ingress of moisture in any dielectric insulation system will ultimately cause failure of that system. Existing insulator systems that have been modified for applications of optical fibers relying on mechanical sealing mechanisms at both extremities of the insulator to prevent the ingress of moisture. Long term reliability can be compromised by a relatively minor leak in a mechanical seal during the numerous thermal cycles the insulator experiences during its operating lifetime. The above described use of elastomeric insulator materials in conjunction with a dielectric filling material applied in a unique way to form a continuous void-free bond over the entire length of the optical fibers is a unique advantage provided by the embodiments described herein. The natural flexibility and resilience of the materials used in the inventive insulator systems ensures the integrity of the system over long periods of exposure to conditions, such as thermal cycling and line vibration, which can have serious detrimental effects on insulators that rely only on mechanical sealing systems.

Those skilled in the art will recognize that modifications may be made to the basic configurations described herein to provide other types of innovative insulators. For example, the insulator systems described herein also provide the potential to produce an insulator that is itself a sensor system, i.e., a smart insulator. For example, an insulator that could monitor a high voltage transmission line for icing conditions, wind loading, galloping conductors and conductor temperature would only require an optical strain sensor, such as a fiber Bragg grating, attached to the support rod, a temperature sensor attached to the line connection clamp and a second temperature sensor to monitor the ambient temperature and provide a reference source for the other sensors. With this configuration, the strain sensor on the support rod would measure the weight of the attached conductor. Under icing conditions, the weight would gradually and continuously increase at a relatively uniform rate, whereas wind loading and galloping conductors would cause loading having a cyclic nature with rapid load changes.

Figure 6:
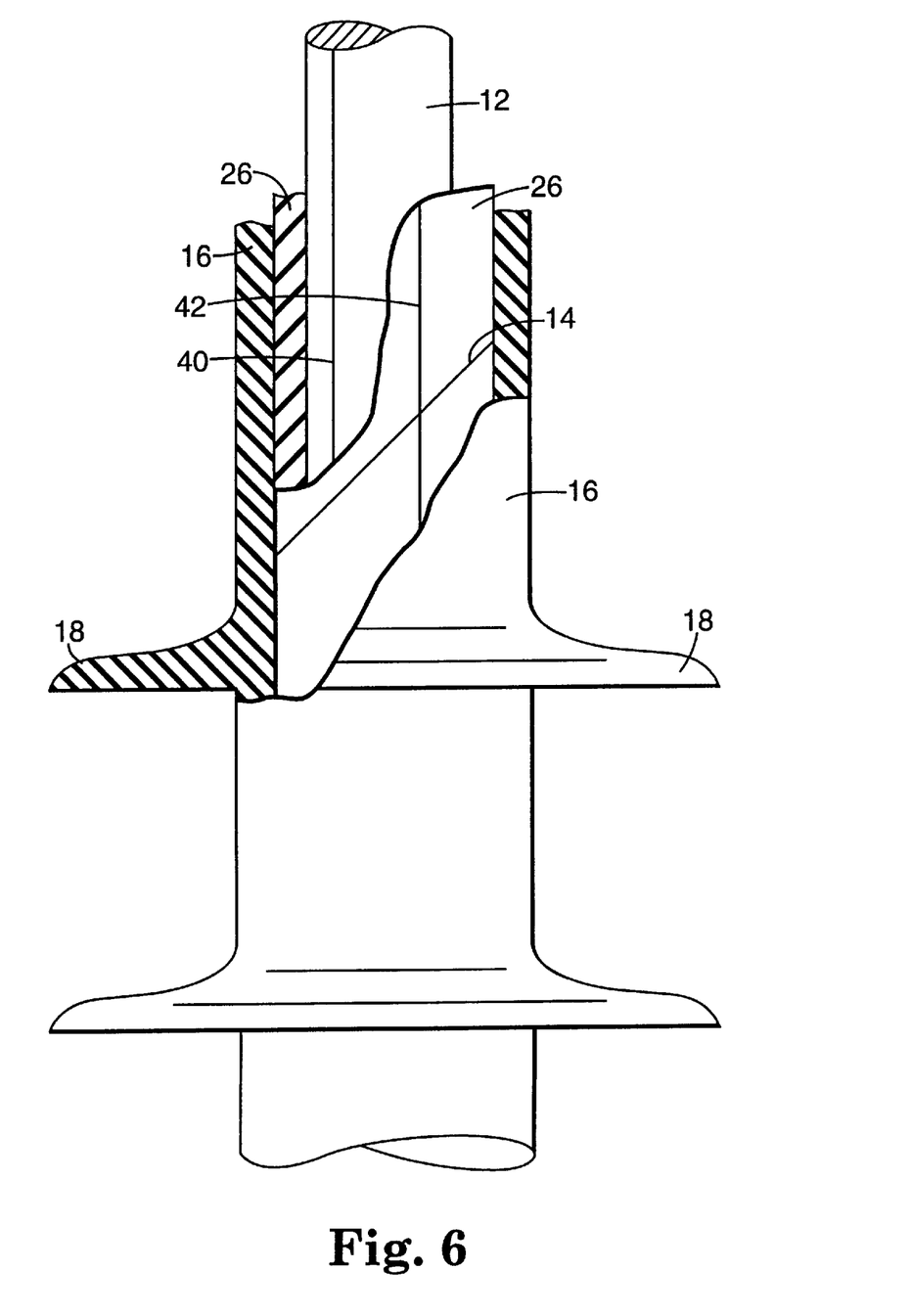
FIG. 6 is an elevational view, partially in cross-section, illustrating the incorporation of strain sensors and temperature sensors into the insulator system.

To achieve an accurate measurement of the line loading conditions, it is important to be able to differentiate changes in the rod caused by changing temperature conditions from changes caused by other elements, previously mentioned, acting on the line. The very unique feature of the inventive insulator systems described herein that makes this possible is the ability to locate a strain sensor and a reference temperature sensor in very close proximity in the same assembly, and yet to maintain mechanical isolation between the two sensors. Construction of this system, illustrated in FIG. 6, involves securing the optical strain sensor 40 onto the support rod 12 so that it will detect all incremental changes in the length of the rod 12. The continuous extruded elastomeric tube 26, as described in embodiment 10' above, is then placed over the support rod 12, optical fiber 14 and strain sensor 40. An optical temperature sensor 42, such as a fiber Bragg grating similar to the strain sensor 40, is applied on the surface of the elastomeric tube 26 and then covered by the outer insulator sleeve 16. This provides a temperature reference that is cushioned between two elastomeric layers and mechanically isolated from the measured strain element.

While the invention has been particularly shown and described herein with reference to preferred embodiments, it will be understood by those skilled in the art that various changes in form and detail may be made therein without departing from the spirit and scope of the invention.

What is claimed is:

1. A high voltage insulator for use with optical fibers, the insulator comprising:
    an insulative support rod;
    at least one optical fiber wrapped about an exterior surface of the support rod;
    an elastomeric insulative outer sleeve covering the at least one optical fiber and support rod wherein the elastomeric insulative outer sleeve is shrinkable from an expanded state for squeezing the at least one optical fiber against the support rod, and
    a dielectric sealant material having a low viscosity disposed adjacent the optical fibers for filling voids adjacent the optical fibers between the support rod and the elastomeric insulative outer sleeve.

2. The insulator of claim 1, wherein the sealant material is a silicone gel.

3. The insulator of claim 1, wherein the sealant material has a viscosity of 750 poise or less.

4. The insulator of claim 1, wherein the sealant material has a viscosity of between approximately 300 and 350 centipoise.

5. The insulator of claim 1, wherein the insulative outer sleeve is formed from silicone.

6. The insulator of claim 1, wherein the insulative outer sleeve includes skirts for increasing the dielectric tracking length of the insulator.

7. The insulator of claim 1, further comprising an inner layer of elastomeric insulative material disposed between the support rod and the optical fibers.

8. The insulator of claim 7, wherein the inner layer of elastomeric insulative material is silicone.

9. The insulator of claim 7, further comprising a strain sensor adjacent the support rod and a temperature sensor positioned between the inner layer of insulative material and the insulative outer sleeve.

10. The insulator of claim 9, wherein the strain sensor is an optical strain sensor and the temperature sensor is an optical temperature sensor.

11. The insulator of claim 1, wherein the insulative support rod is fiberglass.

12. The insulator of claim 1, wherein the insulative support rod is PVC.

13. A method of forming a high voltage insulator for use with optical fibers, including the steps of:
    providing an insulative support rod; wrapping at least one optical fiber about the periphery of the support rod;
    providing a dielectric sealant material having a low viscosity disposed adjacent the optical fibers for filling voids adjacent the optical fibers between the support rod and the elastomeric insulative outer sleeve and
    applying an elastomeric outer sleeve over the optical fiber and support rod wherein the elastomeric insulative outer sleeve is shrinkable from an expanded state for squeezing the at least one optical fiber against the support rod.

14. The method of claim 13, further including the step of applying an inner elastomeric layer over the support rod prior to wrapping at least one optical fiber about the periphery of the support rod.

15. A high voltage insulator for use with optical fibers, the insulator comprising:
   an insulative support rod;
   an inner layer of elastomeric insulative material disposed over the support rod;
   at least one optical fiber wrapped about an exterior surface of the inner layer of elastomeric insulative material;
   an elastomeric insulative outer sleeve covering the at least one optical fiber and support rod; and
   a strain sensor adjacent the support rod and a temperature sensor positioned between the inner layer of insulative material and the insulative outer sleeve.

16. The insulator of claim 15, wherein the strain sensor is an optical strain sensor and the temperature sensor is an optical temperature sensor.

* * * * *